No. 726,146. PATENTED APR. 21, 1903.
D. A. DICKINSON.
VEHICLE COUPLING.
APPLICATION FILED JAN. 8, 1903.
NO MODEL.
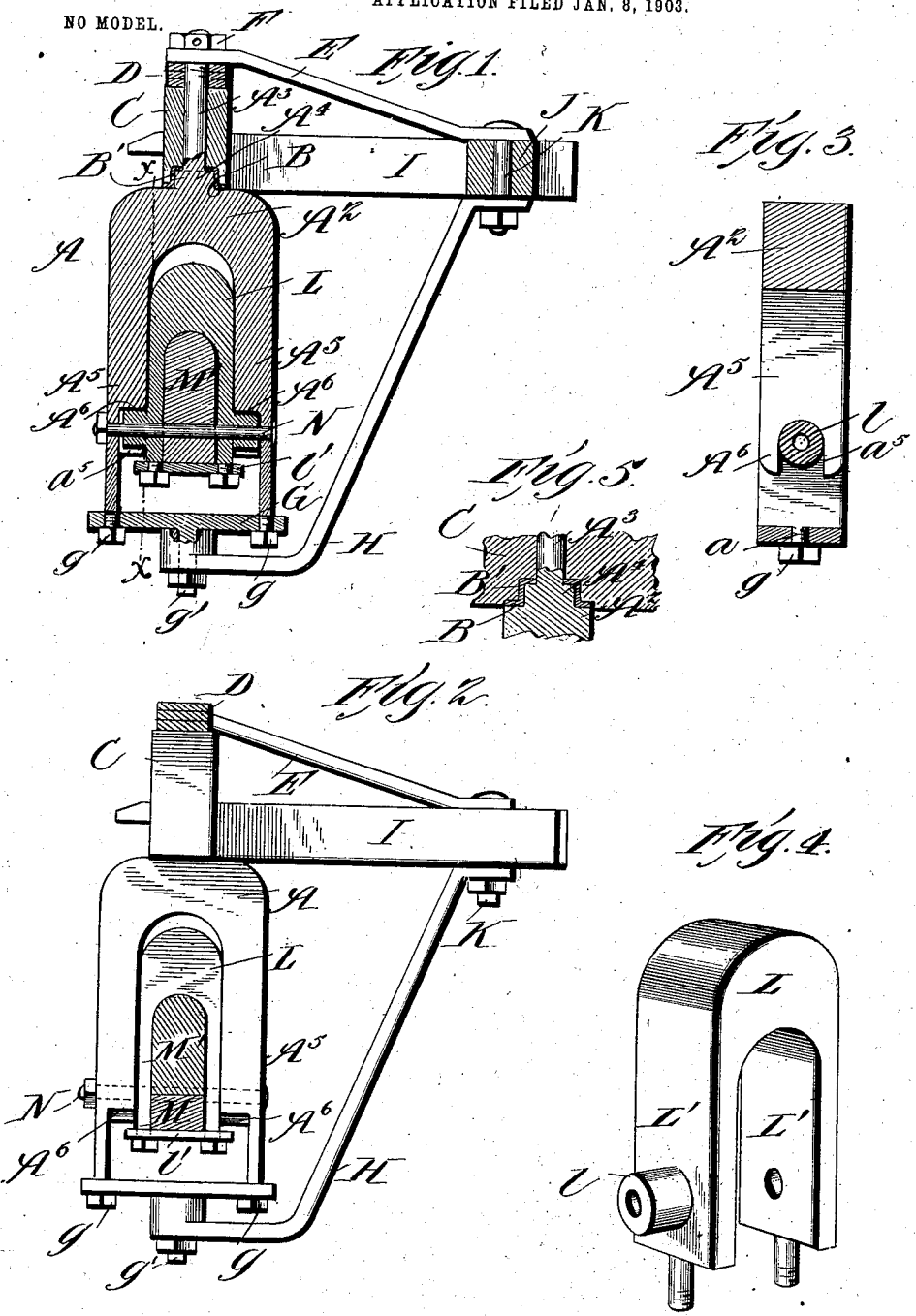
WITNESSES:
INVENTOR
David A. Dickinson
BY Munn & Co.
ATTORNEYS.

UNITED STATES PATENT OFFICE.

DAVID A. DICKINSON, OF QUITMAN, GEORGIA.

VEHICLE-COUPLING.

SPECIFICATION forming part of Letters Patent No. 726,146, dated April 21, 1903.

Application filed January 8, 1903. Serial No. 138,273. (No model.)

*To all whom it may concern:*

Be it known that I, DAVID A. DICKINSON, of Quitman, in the county of Brooks and State of Georgia, have invented a new and useful Improvement in Vehicle-Couplings, of which the following is a specification.

My invention relates to an improvement in couplings for vehicles, and has for its object to provide a coupling device for the front and rear running-gear of a vehicle which is simple, consists of few parts, and can be applied to any ordinary vehicle, new or old, and one which requires no oiling of the parts.

To these ends the invention consists in certain novel features of construction, as will be hereinafter fully described, and pointed out in the claims, reference being had to the accompanying drawings, in which—

Figure 1 is a central vertical section through front axle of a vehicle, showing my improvement applied as in use. Fig. 2 is a side elevation, partly in section. Fig. 3 is a detail sectional view on line $x$ $x$ of Fig. 1. Fig. 4 is detached perspective view of the axle-clip. Fig. 5 is a detail sectional view, showing the wear-plate in the head-block.

A represents the king-bolt proper, which consists of the body portion $A^2$, provided with the upwardly-extending bolt $A^3$, which has the collar $A^4$ at its base. These are all integral and are made as a drop-forging. The upper end of the bolt or pin $A^3$ is threaded and after passing through a wear-plate B, having a flanged central collar B' fitting in the head-block C, extends upwardly through said head-block and spring D and the front end of top brace E and is securely held by a nut F, which is locked to said bolt by any suitable means, such as a pin passed through said nut and bolt. The wear-plate B is secured to the lower face of the head-block C. The body of the king-bolt is arched and the side members $A^5$ made quite thick down to near their lower extremity, at which point they are reduced, forming a shoulder $A^6$, the edges of which are rounded, as shown, and have their ends flattened and provided with the threaded bolt extensions $a$, which pass through the clip-yoke G, which is held thereto by nuts $g$. Said clip-yoke is provided at its center with a downwardly-extending integral bolt $g'$, which is passed through the bottom brace H and is secured thereto by a nut.

I I represent the rearwardly-diverging reaches, the front ends of which are fitted and secured in the head-block, and a short distance in the rear of said head-block a cross-bar or brace J is secured to the reaches and between the same. The top brace E and the bottom brace H are securely held to the top and bottom, respectively, of the cross-bar J by a bolt K and nuts. L represents an axle-clip, the side members L' L' of which are provided with the bosses or lugs $l$, which have central perforations which extend through the said side members of the axle-clip in alinement with each other. The axle M and cap M', rigidly secured thereto, is clamped between the side members of the axle-clip by a clip-yoke $l'$, held to the usual threaded reduced ends of the side members of the clip by nuts.

The bosses or lugs $l$ form trunnions and are fitted in vertical recesses or slots $a^5$, open at their lower ends, made in the inner faces of the side members $A^5$ of the king-bolt A. A bolt N passes through the side members of the king-bolt, through the bosses of the axle-clip, and through an opening made through the axle-cap, and said bolt is held in place by a nut screwed on its threaded end. This bolt N serves a twofold purpose—first, to keep the axle in its proper place, and, second, to divide the resistance of the load on both front and rear of the king-bolt. It also, with the aid of the bosses or lugs $l$, supports the weight of the vehicle.

The purpose in having the shoulders $A^6$ rounded at their outer edges is to permit the ends of clip-yoke $l'$ to swing freely without obstruction when the axle oscillates vertically.

It will be noted that with the construction shown one of the wheels may run over a stump or other obstruction and the axle will oscillate without causing any undue strain on the king-bolt or rest of the parts. The axle can also be freely swung horizontally, as in turning, by virtue of the upper extension of the king-bolt passing through the head-block. It will also be noticed that no oiling of parts is necessary. Hence there will be no tendency for dust to collect on oil-covered parts.

My improved coupling consists of very few parts, is exceedingly simple, can be made very cheaply, and can be applied to any vehicle, new or old, using the ordinary clip king-bolt.

My improvement can be readily applied to any of the common forms of couplings or fifth-wheels in use without making any material change in construction, and by taking out the bolt N it may be used in addition to any of the ordinary fifth-wheels.

Having thus described my invention, what I claim as new, and desire to secure by Letters Patent, is—

1. In a vehicle-coupling the combination with the head-block and axles, of a king-bolt pivotally secured to said head-block and comprising a body portion, downwardly-projecting side members having their inner faces provided with vertical grooves or channels open at their lower ends, an axle-clip surrounding the axle within the king-bolt and provided with circular bosses or lugs projecting outwardly from its sides, said bosses or lugs adapted to enter and bear in the vertical grooves or channels in the inner faces of the king-bolt side members, a clip-yoke securing the king-bolt to the axle-clip, means for securing the axle-clip to the axle and means for securing the king-bolt to the head-block.

2. In a vehicle-coupling the combination with the head-block and axle of a king-bolt pivotally secured in said head-block and comprising a body portion, an upwardly-projecting bolt, perforated side members, said side members provided with shoulders on their inner faces, open-ended slots or recesses extending upwardly from said shoulders and a clip-yoke securing the lower ends of said side members, an axle-clip provided with bosses or lugs projecting from its sides and having openings extending through said bosses or lugs and the sides of the axle-clip in alinement, said bosses or lugs adapted to enter and bear in the slots or recesses in the side members of the king-bolt, a bolt passing through said bosses, the axle and the king-bolt, and means for securing the king-bolt to the head-block and to the reach.

3. In a vehicle-coupling the combination with the axle, head-block, reach and braces, of a king-bolt comprising an arched body portion upwardly-projecting bolt and internally-shouldered side members, said side members having open-ended grooves or channels open at their lower end extending upwardly from the shoulders, and openings therethrough, an axle-clip secured to the axle and provided with side trunnions journaled in the grooves or channels in the side members of the king-bolt.

4. A vehicle-coupling comprising a king-bolt member consisting of a body portion, an upwardly-extending bolt internally-shouldered and perforated side members, provided with open-ended slots or recesses and a clip-yoke for securing the lower ends of said side members, and an axle-clip provided with bosses or lugs fitting and bearing in the recesses of the king-bolt, and having openings extending through said bosses, a bolt adapted to pass through the perforations in the king-bolt, bosses and an axle held in said axle-clip and a clip-yoke for securing the lower ends of the axle-clip together and clamping an axle therein.

DAVID A. DICKINSON.

Witnesses:
WILLIAM H. HARDEN,
GEORGE D. RAYSOR.